Jan. 2, 1951    R. J. DURBROW    2,536,922

PLASTIC CENTERING DISK FOR PHONOGRAPH RECORDS

Filed Jan. 30, 1948

Inventor

Robert J. Durbrow

By Alexander Nowell (signature)

Attorneys

Patented Jan. 2, 1951

2,536,922

UNITED STATES PATENT OFFICE 2,536,922

PLASTIC CENTERING DISK FOR PHONOGRAPH RECORDS

Robert J. Durbrow, Dubuque, Iowa

Application January 30, 1948, Serial No. 5,414

1 Claim. (Cl. 274—42)

My invention is a novel disc of transparent plastic material for use in recentering phonograph record holes that have become worn from frequent use.

The primary object of my invention is to provide a simple and effective means of repairing the centering hole on worn phonograph records, the repairing thereof being simple enough to be done by the average person at home without the use of tools.

Another important object of my invention is the provision of a disc of such diameter as will snugly fit the master groove recess on the standard phonograph records, thus exactly recentering the recording.

Still another object of the invention is to provide a disc of transparent plastic, such as Vinylite, so that the title of the recording will be clearly readable therethrough when the disc is cemented in place.

A further object of the invention is the provision of a disc of strong material which may be made thin enough to lie entirely within the master groove recess of the recording so as not to change the overall thickness thereof or cause slippage by raising the main body of the repaired recording above the supporting record or turntable therebelow.

Other objects and advantages of my invention will become apparent during the following discussion of the drawing, wherein.

Figures 1, 2, 3:
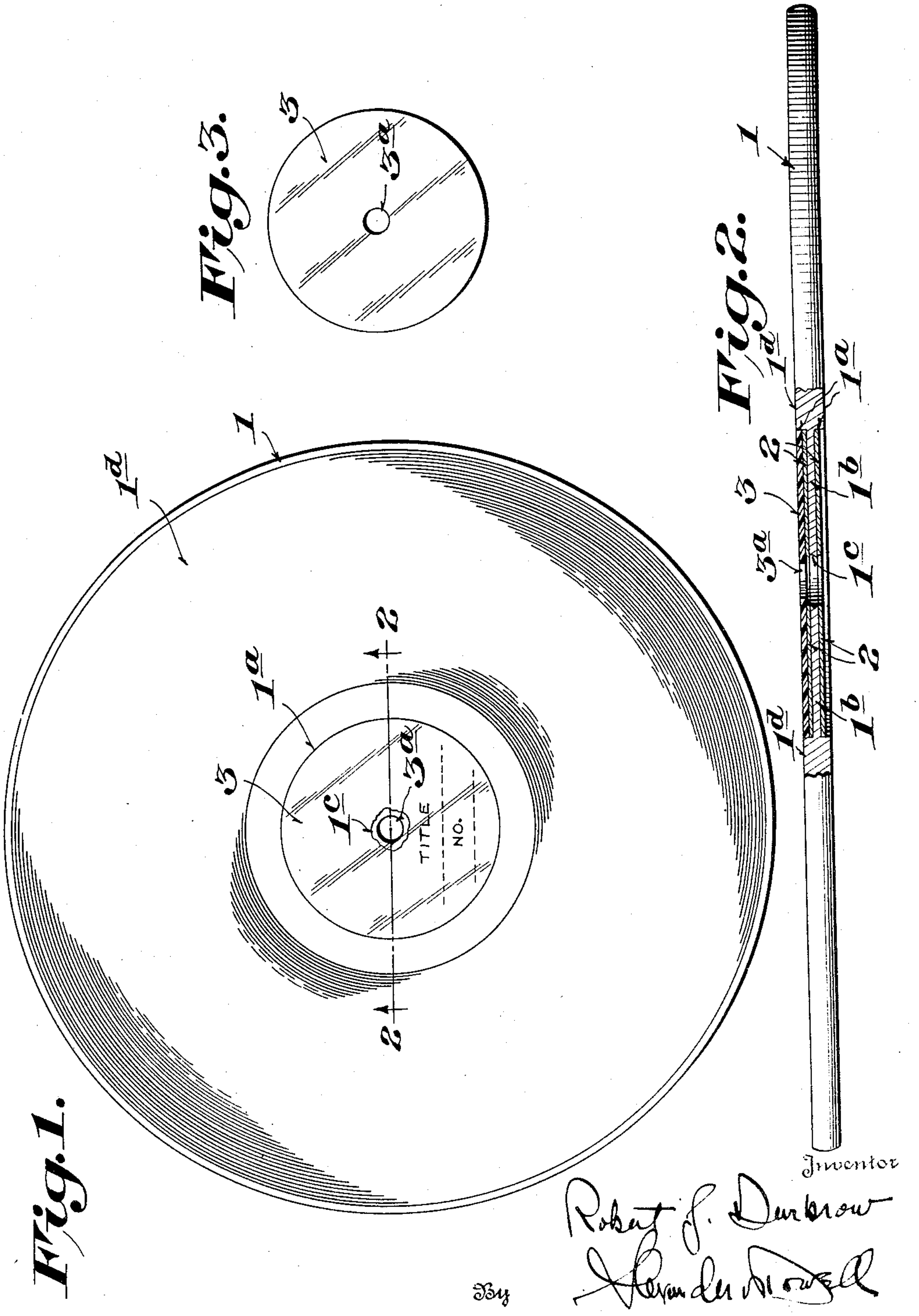
Figure 1 is a plan view of the phonograph record with the plastic disc mounted in place.
Fig. 2 is an edge elevation of the record with the central portion in section, as along line 2—2 of Fig. 1.
Fig. 3 is a plan view of the plastic recentering disc.

Referring to the drawing, the phonograph record 1, of standard design and dimensions, has a master groove 1*a* just inside of the recording's sound track, the hub 1*b* of the recording being of reduced thickness inside of the master groove 1*a*. The diameter of the master groove and the thickness of the reduced hub portion of recordings sold by the various manufacturers at present are standardized, and the circle of the master groove is exactly centered with respect to the sound tracks of the record. Firmly fixed to each surface of the hub 1*b* within the master groove 1*a* are the title seals 2 of the recordings.

Repeated use of the record, particularly on automatic record-changing machines, causes wear and chipping of the walls of the hole 1*c* in the center of the record. A record with its center hole thus enlarged will no longer remain properly centered on the turntable, and such eccentricity thereof results in non-uniform relative velocity between the record sound track and the playback needle as the record revolves. The music, etc., thus played has a corresponding wobble of a very unpleasant character.

To eliminate such unpleasantness and insure the proper centering of worn records a transparent plastic disc 3, having a concentric hole 3*a* of the same diameter as the original hole in the center of the record, is fitted snugly within the recess formed by the reduced hub 1*b* within the master groove 1*a*. Experience has shown that the thickness of the plastic disc 3 should be about 10 thousandths of an inch, for use with the present commercial records, though this dimension is variable to suit different applications. It is, however, important that the outer surface of disc 3 should preferably not extend beyond the level of the main body 1*d* of the record so that the overall thickness thereof is not increased, and so that the surfaces 1*d* of adjacent records will engage each other to prevent slipping of the top record with respect to the turntable.

The transparent disc 3, when secured in place as shown in Fig. 2 using transparent cement, will allow the title seal 2 of the record to be easily read therethrough. The use of two such discs, one in the recess in each side of the record hub, may be required by certain types of record changing equipment or may be resorted to to increase the strength of the centering hole where the record is to receive unusually rugged use. If, for any reason, a record becomes warped convex on the side where the plastic disc 3 is secured and slippage occurs, this may be overcome by scratching or scoring the surface of the disc 3 to increase the friction thereof.

I do not limit my invention to the exact form shown in the drawing, for, obviously, changes may be made therein within the scope of the claim.

I claim:

In combination with a phonograph record disc having a hub portion of reduced thickness defining a central recess having a label therein, said hub having a spindle receiving hole therein; a solid transparent plastic disc snugly fitting within the said recess and overlying the said hub and label and secured thereto by cement, said plastic disc having a centrally disposed spindle receiving cylindrical hole therein of substantially the same diameter as the spindle to be received therein and being of a thickness no greater than the depth of said recess.

ROBERT J. DURBROW.

REFERENCES CITED

The following references are of record in the file of this patent:

UNITED STATES PATENTS

| Number | Name | Date |
|---|---|---|
| 832,403 | Milans | Oct. 2, 1906 |
| 1,553,931 | Challenger | Sept. 15, 1925 |
| 1,637,544 | Bishop | Aug. 2, 1927 |
| 1,755,743 | Morrison | Apr. 22, 1930 |
| 1,804,453 | Basseches | May 12, 1931 |
| 1,821,916 | Acheson et al. | Sept. 8, 1931 |
| 1,915,348 | Acheson | June 27, 1933 |

FOREIGN PATENTS

| Number | Country | Date |
|---|---|---|
| 543,767 | Germany | Feb. 9, 1932 |
| 381,164 | Great Britain | Sept. 26, 1932 |